Inventor
Edward L. Bowles
by David Rines
Attorney

Patented Feb. 25, 1936

2,031,923

UNITED STATES PATENT OFFICE 2,031,923

METHOD AND MEANS FOR MEASURING DYNAMIC CHARACTERISTICS

Edward L. Bowles, Watertown, Mass.

Application February 26, 1927, Serial No. 171,238

17 Claims. (Cl. 250—27)

The present invention relates to electric meters, and more particularly to the measurement of the dynamic characteristics of space-current devices, like vacuum tubes, and other electric instruments. Included within the term "dynamic characteristics" of a vacuum tube are the amplification coefficient, commonly denoted by $\mu$, the internal plate resistance, $r_p$, and the mutual conductance, $g_m$. In the case of a three-electrode vacuum tube, as is well known, these dynamic characteristics are differential functions of the plate and grid voltages and the plate current of the tube. They are obtainable from the static curves of the appropriate quantities, but very awkwardly and inaccurately, involving manual adjustment of direct-current resistances or other devices and interpretation of incremental variations of current. The amplification coefficient is given as the slope of the plate-voltage, grid-voltage characteristic of a vacuum tube; the dynamic, internal-plate resistance is given as the slope of the plate-voltage, plate-current characteristic (when plate volts are plotted as ordinates); and the mutual conductance is given as the slope of the grid-voltage, plate-current characteristic. These dynamic characteristics, therefore, apply to any region of the corresponding characteristic, no matter what the curvature, or the rate of change of the slope. The alternating measuring voltage must necessarily, therefore, be small enough so that the current response resulting from this voltage is proportional to the voltage. Should the voltage be too large, this relationship between cause and effect would not be linear and the response would, therefore, not be a true indication of the desired dynamic coefficient. It is a recognized fact, in other words, that, in measuring any dynamic-tube coefficient, the alternating, measuring voltage must be so small that no appreciable harmonics are produced (due to the curvature of the characteristic). These harmonics amount to by-products which vitiate the results sought.

The chief object of the present invention is to simplify and improve upon present-day methods of and apparatus for measuring such quantities. Other objects will be explained hereinafter, and will be particularly pointed out in the appended claims, it being understood that it is intended to express in the claims all the novelty that the invention may possess.

Figure 1:
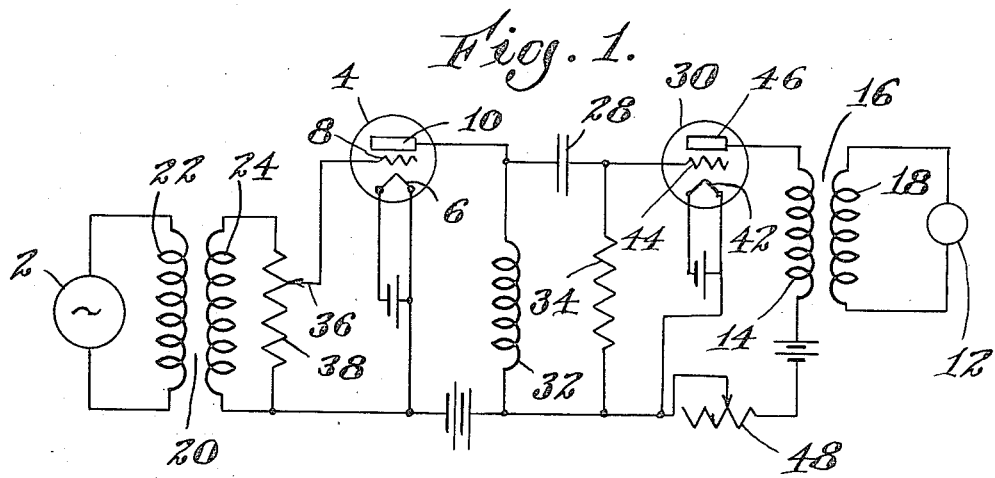
Figure 2:
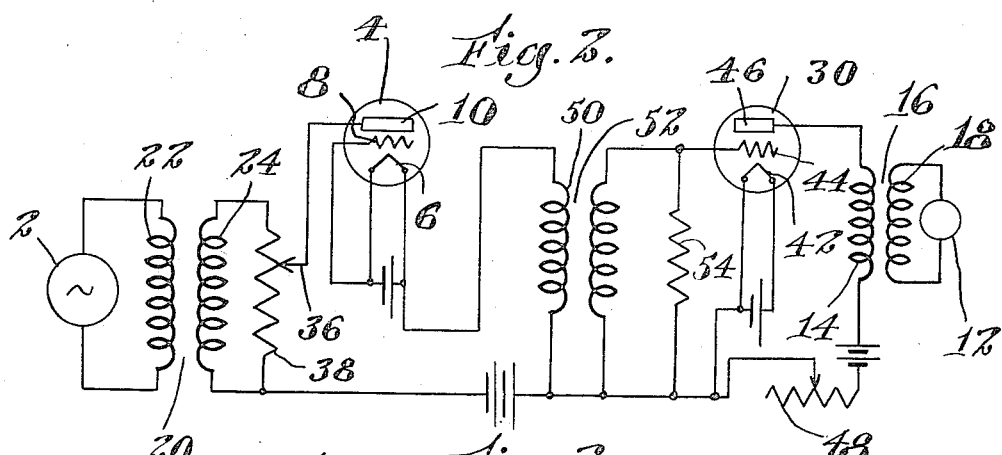
Figure 3:
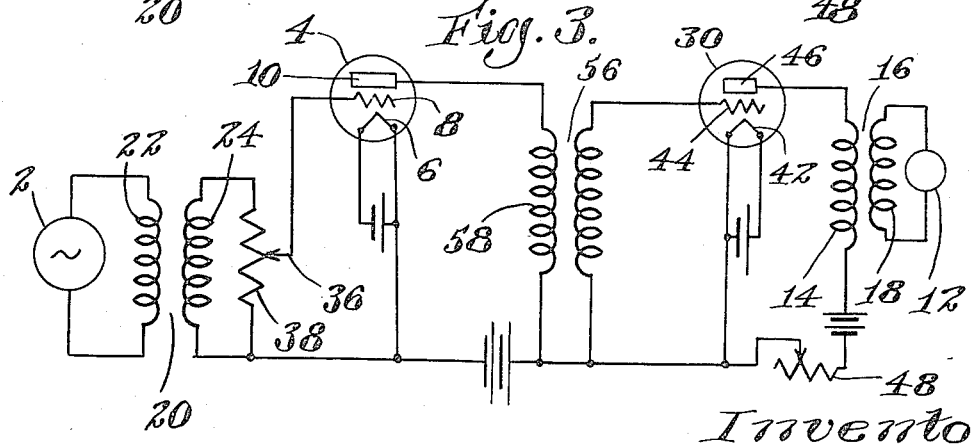
Figure 4:
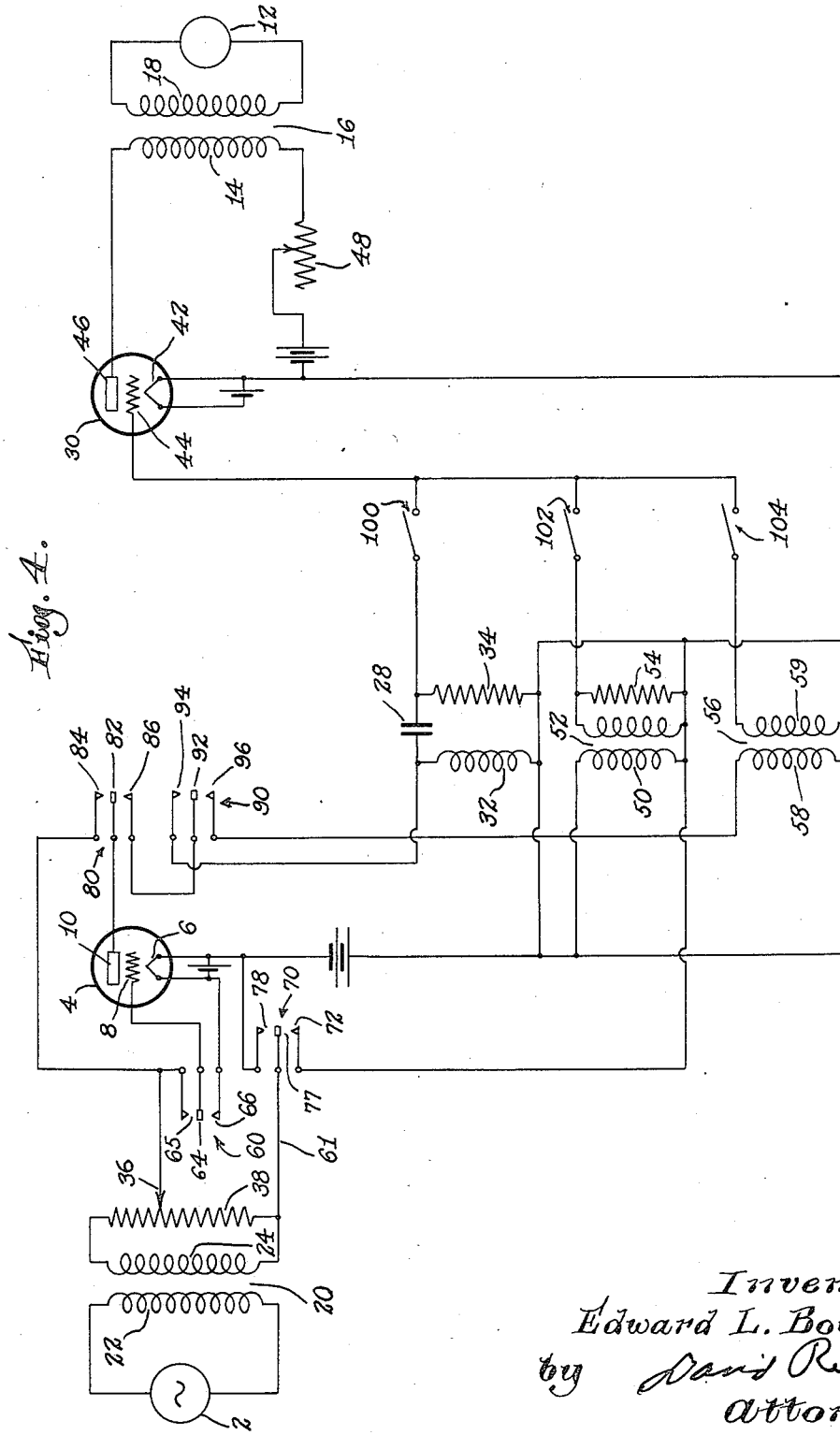

The invention will be explained in connection with the accompanying drawings, in which Figs. 1, 2 and 3 are diagrammatic views of circuits and apparatus constructed and arranged, in accordance with a preferred embodiment of the present invention, to measure the amplification coefficient, the internal plate resistance and the mutual conductance, respectively; and Fig. 4 is a similar diagrammatic view of a complex system embodying the circuits of Figs. 1, 2 and 3, and which is adapted to produce any of the said circuits of Figs. 1, 2 and 3 by manipulation of switches.

To fix the ideas, let it be assumed that it is desired to measure the dynamic characteristics of each of a plurality of vacuum tubes 4, each having a plurality of electrodes, namely, a filament 6, a grid 8 and a plate 10. Once the measurement of the characteristics of this tube is understood, the measurement of other electrical devices will be equally clear; and though the description will proceed upon the basis that a particular tube 4 is had in mind, it will also be apparent that any number of such tubes or other devices may be connected in and out of circuit, one after another, for the purposes of measurement.

The tube 4 is connected with a source of alternating voltage 2, either directly or, preferably, through a transformer 20. The primary winding 22 of the transformer 20 is connected in circuit with the source 2, and the secondary winding 24 is connected in the grid or input circuit of the tube 4. The secondary winding 24 is shown shunted by a resistor or voltage divider 38. If a definite, constant current is caused to traverse the resistor 38, then a definite voltage may be applied to the grid 8 of the tube 4 under test by adjusting the slider 36 along this resistor 38. The magnitude of this voltage applied to the grid 8 will, for a constant current in the resistor 38, be a function of the position of the slider 36. As will hereinafter appear, it is desirable to apply the same, constant voltage to the grids 8 of all tubes 4 under test, as this facilitates reading direct values of the dynamic characteristics upon an alternating-current indicating instrument 12, such as a galvanometer. The use of a constant impressed voltage is not, however, essential, for the readings of the meter 12 may be corrected by suitable calculations if known, variable voltages are applied to the grids 8 of the various tubes under test. In fact, the use of known, variable voltages is sometimes desirable, as both low-amplification and high-amplification tubes may then be measured with the same instrument 12. In such cases, furthermore, the instrument 12 may be provided with a plurality of differently graduated scales, each corresponding to a particular one of several impressed voltages upon the grid 8, or a given scale may be understood to apply with a constant multiplying factor depending upon the type of tube under test.

The output circuit of the tube 4 is coupled to the input circuit of an amplifier 30 having a filament 42, a grid 44 and a plate 46. Several stages of amplification may be employed, if preferred, but the amplifier is common to all the tubes 4 to be tested. The coupling may be effected in any suitable manner, preferably, in Fig. 1, through a coupling impedance 32 of impedance so high that the internal plate resistance of the tube 4 is negligible by comparison. Under such conditions, in alternating voltage, $V_g$, applied to the grid 8 of the tube 4 under test will produce a voltage $\mu V_g$ times as great across the impedance 32; and it is $\mu$ that it is desired to measure. The $\mu$ of the successive tubes 4 may be measured by successively connecting them in the common input circuit and the common output circuit before described and reading the successive deflections of the meter 12, assuming the impedances of these common input and output circuits to be substantially constant. With proper calibration of the meter 12, therefore, it is possible to measure an alternating-current impulse independently of the source 2 of voltage, and as a direct indication of the dynamic characteristic desired.

The increased voltage, $\mu V_g$, may be impressed upon the input or grid circuit of the amplifier tube 30 through a by-pass condenser 28. A grid-leak resistor 34 enables any residual charge to leak off the grid 44. The alternating voltage thus produced in the plate circuit of the tube 30 will be transmitted through a transformer 16 to the meter 12. The primary winding 14 of the transformer 16 is connected in the output circuit of the amplifier 30 and the secondary winding 18 is connected with the meter 12.

The meter 12 may be made to read $\mu$ directly, as before explained, by maintaining the source 2 of voltage at constant potential for all tubes 4 under test, through the medium of the voltage divider 36.

The resistance of the leak resistor 34 should be of such value that the internal impedance from the grid 44 to the filament 42 is large by comparison. The amplifier tube 30 may then be replaced by another amplifier without upsetting the characteristics of the same due to a change in the impedance in the circuits shown to the right of the impedance 32, and including the input impedance of the tube 30. Furthermore, since different tubes of the same type may have dynamic characteristics of different values, the use of different tubes 30 will introduce variations in the readings of the meter 12 for the same, constant voltage applied to the tube 4, notwithstanding the use of a common input circuit and a common output circuit for the amplifier tubes 30, with substantially constant impedances in the common amplifier input and output circuits. A variable resistor 48 may, therefore, be inserted in the output circuit of the amplifier 30 to compensate for such differences, and so as to give the same reading in the meter 12, notwithstanding different amplifiers 30 may be employed.

The dynamic internal plate resistance of the tube 4 may be measured by connecting the point indicated by the slider 36 in the output circuit of the tube 4 in series with the primary winding 50 of a transformer 52. The constant voltage is, this time, therefore, impressed upon the output circuit of the tube. The current of the output circuit will, of course, be inversely proportional to the total impedance of the output circuit if the impressed voltage is constant. As all other resistances of the output circuit are preferably made exceedingly small compared to the internal plate resistance, the current in the output circuit, which is proportional to the voltage in the output circuit of the tube 4, will, therefore, for practical purposes, be inversely proportional to the internal plate resistance. Current from the output circuit of the tube 4 will be transmitted to the amplifier 30 by the transformer 52, and the amplified current will be measured by the meter 12. In addition to the variable resistor 48, which is used as before described, a resistor 54 may be employed, connected between the grid 44 and the filament 42. The resistance of the resistor 54 should be of such value that the internal impedance from the grid 44 to the filament 42 is large by comparison. This decreases the effect of the internal input impedances of different amplifiers 30, with result that the amplifier tube 30 may then be replaced by another amplifier without upsetting the characteristics of the indicating instrument due to a change in the impedance in the circuits shown to the right of the transformer 52.

To measure the mutual conductance of the tube 4, the definite, constant voltage is impressed upon the input circuit, as in the arrangement of Fig. 1, but the output circuit is connected with the input circuit of the amplifier by a transformer 56, as in Fig. 3. The input impedance of the primary winding 58 of the transformer 56 should be negligible compared with the dynamic internal plate resistance of the tube 4, in order that the current of the output circuit of the tube shall be inversely proportional to the dynamic internal plate resistance of this tube; in which case, since the voltage appearing in the plate circuit is proportional to the amplification coefficient, this would make the current in the plate circuit proportional to the amplification factor $\mu$ and inversely proportional to the dynamic, internal plate resistance $r_p$. The deflection of the meter 12 will be proportional to the mutual conductance of the tube 4, and the value of the mutual conductance of different tubes 4 may, therefore, be read directly on the meter 12.

The same apparatus, therefore, may, by different circuit connections, be employed to indicate, by direct deflection, in mutually exclusive fashion, the various dynamic characteristics of the vacuum tube 4. The connections may readily be changed by means of suitable switches, so as to provide the input circuits and in effect the corresponding output circuits of any of Figs. 1, 2 and 3, as will be understood by reference to Fig. 4, where the switches are shown, for simplicity of illustration, at 60, 70, 80, 90, 100, 102 and 104. The switches may, however, be incorporated into a single unit.

The switch 60 comprises a contact member 64 that may make contact either with an upper, spring contact member 65, or a lower contact member 66. When it makes contact with the upper contact member 65, the slider 36 is connected by the contact members 64 and 65 to the grid 8, as in Figs. 1 and 3. At such time, a spring contact arm 77 of switch 70 is maintained out of engagement with the contact member 72, but it is engaged with a contact member 78 to provide a connection from the filament 6, by way of the contact members 77 and 78 and a common lead 61, to the lower end of the secondary winding 24, also as in Figs. 1 and 3. Consider now the switch 80 comprising a spring contactor 82 making contact with either of contact members 84, 86. The spring contact member 82 should be in contact with contact member 86. In this position of the switches 60, 70 and 80, any voltage subtended on the voltage divider 38 by the slider 36 will be applied between the filament and the grid of the tube 4 (corresponding to conditions of Figs. 1 and 3).

To obtain the Fig. 2 connections of the slider 36, the contact member 64 of switch 60 is lowered into contact with the contact member 66, the grid will then return directly to the filament 6, thus opening contact between contact members 64 and 65. The contact member 82 of switch 80 is raised into contact with contact member 84 (opening contact between members 86 and 82). The slider 36 will then become connected through the contact members 82 and 84 to the plate 10. If also the spring contact arm 77 of switch 70 is, at the same time, lowered into contact with the contact arm 72, (instead of making contact with contact member 78) connection will be made between the lower end of the secondary winding 24 and the filament through the primary winding 50 of the transformer 52, as in Fig. 2.

In this position of the switches 60, 70 and 80, the grid 8 returns directly to the filament 6, through the contact members 64 and 66, and the voltage subtended by the slider 36 on the voltage divider 38 is now applied in series with the plate 10 and the filament 6 as in Fig. 2.

Thus, with the switches 60, 70 and 80 in the first position described, namely, the member 64 engaging the contact member 65, (and with the contact members 64 and 66 open), with the contact member 77 engaging the contact member 78 (and with the contact members 72 and 77 open), and with contact members 82 and 86 closed (and with contact members 82 and 84 open), the input-circuit connections of the tube 4 correspond to Figs. 1 and 3. With the switches 60, 70 and 80 in the second position described, namely, with the member 64 engaging the contact member 66 (and with contact members 64 and 65 open), the contact member 77 engaging the contact member 72 (the contact between members 77 and 78 being open), and the contact member 82 engaging the contact member 84 (the contact members 82 and 86 being open), the input-circuit connections of the tube 4 correspond to Fig. 2.

With contacts 82 and 86 of switch 80 closed and contacts 77 and 78 of switch 70 closed, considering now switches 90, 100, 102 and 104, with contact members 92 and 94 closed (contact members 92 and 96 open) and with switch 100 closed (switches 102 and 104 open) the connections of the output circuit of tube 4 under test correspond to Fig. 1. Under the same conditions of switch 80 but with contact members 92 and 96 closed (contact members 92 and 94 open) and with switch 104 closed (switches 100 and 102 open) the connections of the output circuit of tube 4 under test correspond to Fig. 3. With contacts 82 and 84 of switch 80 closed and contacts 72 and 77 of switch 70 closed and with switch 102 closed (switches 100 and 104 open) the output circuit connections of tube 4 correspond to Fig. 2.

From this description of the connections effected by the switches 60, 70, 80, 90, 100, 102 and 104 of Fig. 4, it will be clear that if it is desired to determine the amplification coefficient $\mu$ of tube 4 under test, it is only necessary to close contact members 64—65 of switch 60, 77—78 of switch 70, 82—86 of switch 80, 92—94 of switch 90 and switch 100 (opening 64—66 of switch 60, 77—72 of switch 70, 82—84 of switch 80, 92—96 of switch 90 and switches 102 and 104). Again, if it is desired to measure the mutual or transconductance $g_m$ of tube 4 under test, the switches 60, 70 and 80 are left in the same position as for the measurement of the amplification coefficient $\mu$ mentioned above, but the contact members 92—96 of switch 90 and switch 104 are closed. Finally, if it is the dynamic internal plate resistance $r_p$ of the tube 4 under test that it is desired to determine, contact members 64—66 of switch 60, 72—77 of switch 70, 82—84 of switch 80 and switch 102 are closed (contact members 64—65, 77—78 and switches 100 and 104 being open).

In some cases, it may be possible to utilize a single transformer in place of the two transformers 52 and 56.

The tube 4 may be conveniently connected in and out of circuit by means of a suitable socket or other receptacle (not shown) that is permanently connected in circuit.

For definiteness, in the claims the term "alternating-current impulse" or its equivalent will be employed to denote either an alternating voltage or an alternating current.

Modifications will readily occur to persons skilled in the art, and all such are intended to be embraced within the appended claims.

What is claimed is:

1. A method of measuring the amplification coefficient of a space-current device externally connected so as to have an input circuit and an output circuit, the output circuit having an impedance of value so high that the internal plate resistance of the device is negligible by comparison, the said method comprising impressing a voltage upon the input circuit, and measuring the voltage across the impedance.

2. A method of measuring the amplification coefficient of a space-current device externally connected so as to have an input circuit and an output circuit, the output circuit having an impedance of value so high that the internal plate resistance of the device is negligible by comparison, the said method comprising impressing a voltage upon the input circuit, amplifying the voltage across the impedance, and measuring the amplified voltage.

3. A method of measuring the amplification coefficient of a plurality of space-current devices each externally connected so as to have an input circuit and an output circuit, the output circuit having an impedance of value so high that the internal plate resistance of each device is negligible by comparison, the said method comprising impressing a constant voltage upon each input circuit, amplifying the voltage across the impedance by a constant amount, and measuring the amplified voltage.

4. A method of measuring a dynamic characteristic of each of a plurality of space-current devices each having a plurality of electrodes that comprises impressing a constant alternating voltage between two electrodes of each device, amplifying an alternating-current impulse between two electrodes of the device, and measuring the amplified alternating-current impulse.

5. Apparatus for measuring the amplification coefficient of a space-current device having an input circuit and an output circuit having, in combination, means for impressing a voltage upon the input circuit, an impedance in the output circuit of value so high that the internal plate resistance of the device is negligible by comparison, and means for measuring the voltage across the impedance.

6. Apparatus for measuring the amplification coefficient of a space-current device having an input circuit and an output circuit having, in combination, means for impressing a voltage upon the input circuit, an impedance in the output circuit of value so high that the internal plate resistance of the device is negligible by comparison, an amplifier having an input circuit connected with the output circuit of the space-current device, and means for measuring the voltage of the amplifier output circuit.

7. Apparatus for measuring the amplification coefficient of a space-current device having an input circuit and an output circuit having, in combination, means for impressing a voltage upon the input circuit, an impedance in the output circuit of value so high that the internal plate resistance of the device is negligible by comparison, an amplifier having an input circuit in which the impedance is connected and an output circuit containing a variable impedance, and means for measuring the voltage of the amplifier output circuit.

8. Apparatus for measuring the amplification coefficient of a space-current device having an input circuit and an output circuit having, in combination, means for impressing a voltage upon the input circuit, means for adjusting the voltage, an impedance in the output circuit of value so high that the internal plate resistance of the device is negligible by comparison, an amplifier having an input circuit connected across the impedance and an output circuit, means for compensating for the amplification of the amplifier, and means for measuring the voltage of the amplifier output circuit.

9. Apparatus for measuring a dynamic characteristic of each of a plurality of space-current devices having, in combination, a common input circuit and a common output circuit with which the space-current devices are adapted to be successively connected, the input and the output circuits having substantially constant impedances, means for impressing an alternating voltage from a source of voltage upon the space-current devices when so connected, and means independent of the source of voltage for measuring an alternating-current impulse of the output circuit as a direct indication of the value of the dynamic characteristic.

10. Apparatus for measuring a dynamic characteristic of each of a plurality of space-current devices having, in combination, a common input circuit and a common output circuit with which the space-current devices are adapted to be successively connected, the input and the output circuits having substantially constant impedances, means for impressing an alternating voltage from a source of voltage upon the space-current devices when so connected, means for rendering the impressed voltages constant, and means independent of the source of voltage for measuring an alternating-current impulse of the output circuit as a direct indication of the value of the dynamic characteristic.

11. Apparatus for measuring, in mutually exclusive fashion, a plurality of the dynamic characteristics of a plurality of space-current devices having, in combination, a plurality of input circuits and a plurality of corresponding output circuits with which the space-current devices are adapted to be successively connected, each input circuit and its corresponding output circuit corresponding to one of the dynamic characteristics that it is desired to measure, means for impressing an alternating voltage upon the space-current devices when so connected, a common amplifier having a common input circuit and a common output circuit having substantially constant impedances, means for connecting the amplifier input circuit with the output circuits of the space-current devices, and means for measuring an alternating-current impulse of the amplifier output circuit.

12. Apparatus for measuring, in mutually exclusive fashion, the dynamic internal plate resistance and another dynamic characteristic of a plurality of space-current devices having, in combination, two input circuits, two corresponding output circuits, the space-current devices being adapted to be successively connected with one or the other input circuit and its corresponding output circuit, means for impressing an alternating voltage upon the space-current devices when so connected, means for adjusting the impressed voltage to a value suitable for measuring the dynamic internal plate resistance and the other dynamic characteristic, respectively, when the space-current device is connected with one or the other input circuit and the corresponding output circuit, respectively, and means for measuring an alternating-current impulse of the output circuits.

13. Apparatus for measuring a dynamic characteristic of each of a plurality of space-current devices having, in combination, a common input circuit and a common output circuit with which the space-current devices are adapted to be successively connected, the input and the output circuits having substantially constant impedances, a voltage divider in one of the circuits, means for impressing an alternating voltage from a source of voltage upon the voltage divider, means for adjusting the voltage divider to maintain constant the voltage impressed upon the space-current devices, and means independent of the source of voltage for measuring an alternating-current impulse of the output circuit as a direct indication of the value of the dynamic characteristic.

14. Apparatus for measuring a dynamic characteristic of each of a plurality of space-current devices having, in combination, a common input circuit and a common output circuit with which the space-current devices are adapted to be successively connected, the input and the output circuits having substantially constant impedances, means for impressing an alternating voltage upon the space-current devices when so connected, a plurality of second space-current devices, a common input circuit and a common output circuit, with which the second space-current devices are adapted to be successively connected, the input and the output circuits of the second space-current devices having substantially constant impedances, means for connecting the input circuit of one of the second space-current devices with the output circuit of the first-named space-current devices, means for compensating for differences in a dynamic characteristic of the second space-current devices, and means for measuring an alternating-current impulse of the output circuit of the second space-current devices.

15. Apparatus of the character described having, in combination, a plurality of space-current devices, a common input circuit and a common output circuit with which the space-current devices are adapted to be successively connected, means for impressing an alternating voltage upon the space-current devices when so connected, means for compensating for differences in a dynamic characteristic of the space-current devices, and means for measuring an alternating-current impulse of the output circuit.

16. In an electric system comprising a common input circuit and a common output circuit and also an amplifier having an input circuit and an output circuit, the amplifier input circuit being connected with the common output circuit to amplify the voltage of the common output circuit, the method of measuring, in mutually exclusive fashion, a plurality of the dynamic characteristics of each of a plurality of space-current devices that comprises successively connecting each space-current device to the common input circuit and the common output circuit, adjusting the impedance of the common output circuit and impressing a substantially constant alternating voltage upon one of the common input and output circuits to render the system sensitive to the measurement of one dynamic characteristic only and insensitive to the measurement of any other dynamic characteristic, maintaining the impedance of said input and output circuits substantially constant, and measuring an alternating-current impulse of the amplifier output circuit as a direct indication of the value of the said one dynamic characteristic.

17. A method of measuring a dynamic characteristic of each of a plurality of space-current devices each having a plurality of electrodes that comprises successively connecting the space-current devices with a common input circuit and a common output circuit, maintaining the impedances of the input and output circuits constant, impressing a constant alternating voltage between two electrodes of each space-current device when so connected, amplifying an alternating-current impulse between two electrodes of each device when so connected, and measuring the amplified alternating-current impulse.

EDWARD L. BOWLES.